United States Patent
Stanek et al.

(10) Patent No.: US 8,534,400 B2
(45) Date of Patent: Sep. 17, 2013

(54) ELECTRIC VEHICLE AND METHOD OF CONTROL FOR ACTIVE AUXILIARY BATTERY DEPLETION

(75) Inventors: Joseph Stanek, Northville, MI (US); Christopher Adam Ochocinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 404 days.

(21) Appl. No.: 13/026,588

(22) Filed: Feb. 14, 2011

(65) Prior Publication Data
US 2011/0168462 A1   Jul. 14, 2011

(51) Int. Cl.
*B60W 10/00* (2006.01)
*H02J 7/00* (2006.01)
*B60L 1/00* (2006.01)

(52) U.S. Cl.
USPC ............ 180/65.265; 180/65.31; 320/103; 320/104; 320/109; 307/10.1; 307/64; 307/65

(58) Field of Classification Search
USPC .......... 320/103, 104, 109; 180/65.1–65.285; 307/10.1, 64, 66
See application file for complete search history.

(56) References Cited

U.S. PATENT DOCUMENTS

| | | | |
|---|---|---|---|
| 6,316,842 B1 | 11/2001 | Kuroda et al. | |
| 6,481,516 B1 | 11/2002 | Field et al. | |
| 6,546,320 B2 * | 4/2003 | Shimizu et al. | 701/22 |
| 6,938,713 B1 * | 9/2005 | Tahara et al. | 180/65.26 |
| 7,839,116 B2 * | 11/2010 | Esaka et al. | 320/103 |
| 7,849,944 B2 * | 12/2010 | DeVault | 180/65.29 |
| 8,154,149 B2 * | 4/2012 | King | 307/9.1 |
| 8,269,457 B2 * | 9/2012 | Wenger et al. | 320/109 |
| 2006/0232238 A1 * | 10/2006 | Horii | 320/104 |
| 2007/0210743 A1 | 9/2007 | Tabei et al. | |
| 2008/0011528 A1 | 1/2008 | Verbrugge et al. | |
| 2012/0169281 A1 * | 7/2012 | Itagaki et al. | 320/109 |
| 2013/0093391 A1 * | 4/2013 | Gale et al. | 320/109 |

* cited by examiner

*Primary Examiner* — John Walters
*Assistant Examiner* — James Triggs
(74) *Attorney, Agent, or Firm* — David B. Kelley; Brooks Kushman P.C.

(57) ABSTRACT

An electric vehicle includes a traction battery, an auxiliary battery, and a controller. The controller is configured to prevent the traction battery from charging the auxiliary battery while the auxiliary battery has more than a minimum energy. The controller is further configured to, upon the auxiliary battery having the minimum energy, enable the traction battery to charge the auxiliary battery such that the auxiliary battery is maintained at the minimum energy.

19 Claims, 3 Drawing Sheets

ELECTRIC VEHICLE AND METHOD OF CONTROL FOR ACTIVE AUXILIARY BATTERY DEPLETION

BACKGROUND

1. Technical Field

The present invention relates to electric vehicles and a method of control.

2. Background Art

The term "electric vehicle" used herein encompasses battery electric vehicles (BEV), hybrid electric vehicles (HEV), and plug-in hybrid electric vehicles (PHEV).

A BEV includes an electric motor, wherein the energy source for the motor is a traction battery. The BEV traction battery is re-chargeable from an external electric grid. The BEV traction battery is in effect the sole source of on-board energy for vehicle propulsion.

A HEV includes an internal combustion engine and an electric motor, wherein the energy source for the engine is fuel and the energy source for the motor is a traction battery. The engine is the main source of energy for vehicle propulsion with the HEV traction battery providing supplemental energy for vehicle propulsion (the HEV traction battery buffers fuel energy and recovers kinematic energy in electric form).

A PHEV differs from a HEV in that the PHEV traction battery has a larger capacity than the HEV traction battery and the PHEV traction battery is re-chargeable from the grid. The PHEV traction battery is the main source of energy for vehicle propulsion until the PHEV traction battery depletes to a low energy level at which time the PHEV operates like a HEV for vehicle propulsion.

Many electric vehicles include an auxiliary battery for providing energy to vehicle accessory loads. Typically, during normal vehicle operation, the traction battery supplies energy to the auxiliary battery in order to maintain the auxiliary battery at a fully charged state (e.g., 100% state of charge (SOC)).

A problem with the traction battery supplying energy to maintain the auxiliary battery at the fully charged state is that this energy is lost for vehicle propulsion until recovered. Further, the amount of lost energy can be exacerbated as the auxiliary battery may not always be charged at most efficient operating points. The lost energy is generally problematic for electric vehicles as efficiency is critical for optimal performance and evaluation. This is especially a problem for a BEV in that the BEV essentially cannot recover the lost energy until the vehicle is connected to the external electric grid.

SUMMARY

An embodiment of the present invention provides a method. The method includes discharging an auxiliary battery of an electric vehicle while the auxiliary battery has more than a minimum energy. The method further includes preventing a traction battery of the vehicle from charging the auxiliary battery while the auxiliary battery has more than the minimum energy. The method further includes, upon the auxiliary battery having the minimum energy, charging the auxiliary battery with the traction battery to maintain the auxiliary battery at the minimum energy. The method may further include recharging the auxiliary battery and the traction battery via an electric grid.

An embodiment of the present invention provides an electric vehicle. The electric vehicle includes a traction battery, an auxiliary battery, and a controller. The controller is configured to prevent the traction battery from charging the auxiliary battery while the auxiliary battery has more than a minimum energy. The controller is further configured to, upon the auxiliary battery having the minimum energy, enable the traction battery to charge the auxiliary battery such that the auxiliary battery is maintained at the minimum energy.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Figure 1:
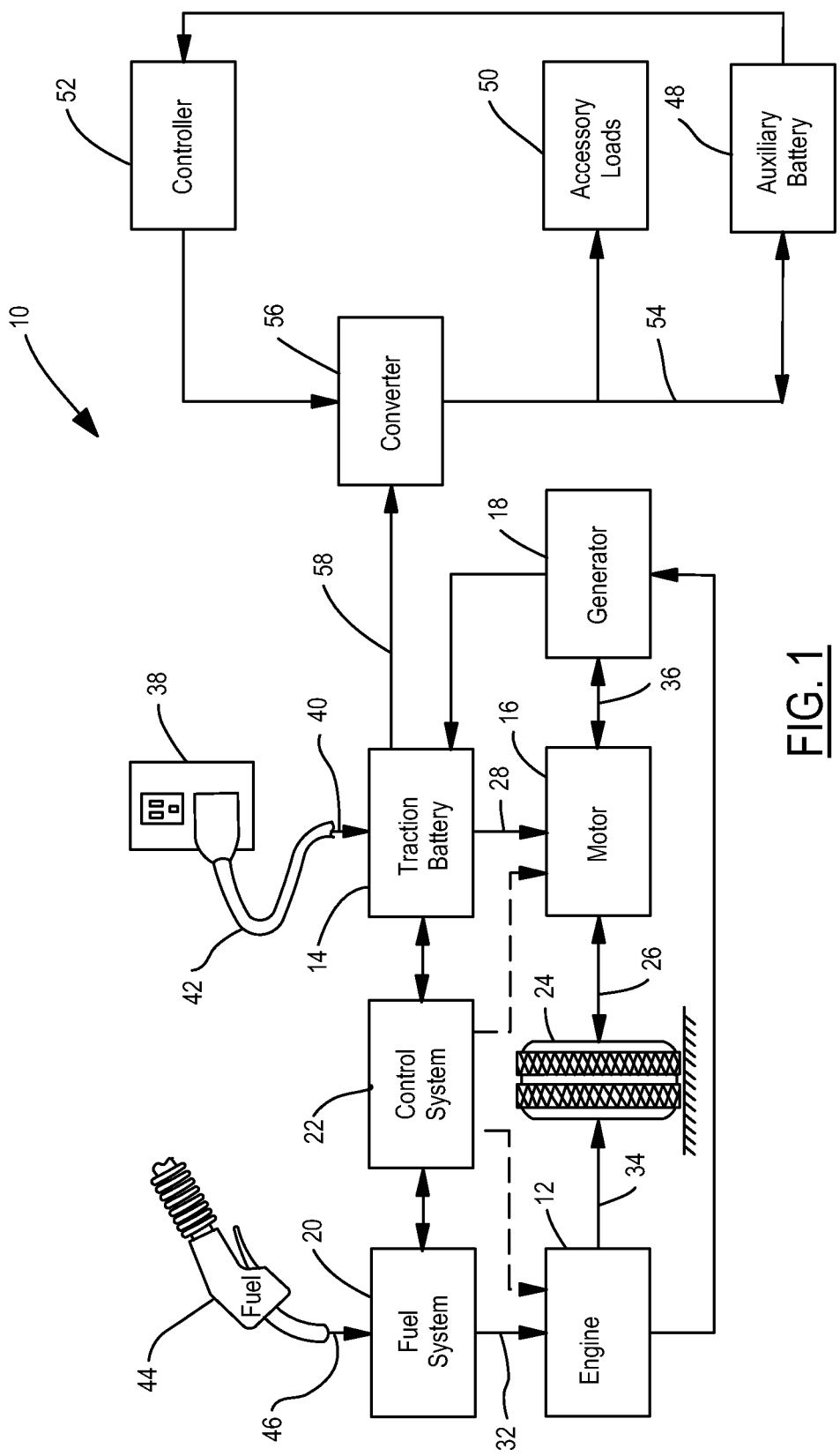
FIG. 1 illustrates a block diagram of a plug-in hybrid electric vehicle (PHEV) in accordance with an embodiment of the present invention.

Referring now to FIG. 1, a block diagram of a plug-in hybrid electric vehicle (PHEV) in accordance with an embodiment of the present invention is shown. PHEV 10 includes an engine 12, a traction battery 14, an electric motor 16, a generator 18, a fuel system 20, and a control system 22. Engine 12 is configured to consume a fuel (e.g., gasoline) to produce an engine output. Traction battery 14 is configured to output and receive electrical energy and store received electrical energy. Motor 16 is configured to consume electrical energy to produce a motor output. Control system 22 is configured to send control signals to and receive sensory feedback information from one or more of engine 12, traction battery 14, motor 16, generator 18, and fuel system 20.

Fuel system 20 has a fuel tank for storing fuel on-board the vehicle. Fuel system 20 periodically receives fuel from a fuel source residing external the vehicle via a fuel dispensing device 44 as indicated by arrow 46.

Fuel system 20 delivers fuel to engine 12 as indicated by arrow 32, whereby the engine combusts the fuel to produce an engine output. The engine output may be used to propel the vehicle as indicated by arrow 34 and/or to recharge traction battery 14 via motor 16 or generator 18.

Traction battery 14 delivers electrical energy to motor 16 as indicated by arrow 28, whereby the motor consumes the electrical energy to produce a motor output. The motor output may be used to propel the vehicle as indicated by arrow 26.

PHEV 10 can have various operating conditions. For example, engine 12 may propel vehicle via drive wheel 24 while motor 16 is deactivated. Motor 16 may propel the vehicle via wheel 24 while engine 12 is deactivated. Engine 12 and motor 16 may propel the vehicle at the same time via wheel 24. In some embodiments, engine 12 propels the vehicle via a first set of drive wheels and motor 16 propels the vehicle via a second set of drive wheels.

During other operating conditions, engine 12 is maintained in an off state while motor 16 is operated to charge traction battery 14. For example, motor 16 receives wheel torque from wheel 24 as indicated by arrow 26 where the motor converts kinetic energy of the vehicle to electrical energy for storage at traction battery 14 as indicated by arrow 28. This operation is referred to as regenerative braking of the vehicle. Thus, motor 16 can provide a generator function in some embodiments. In other embodiments, generator 18 instead receives wheel torque from wheel 24, where the generator converts kinetic energy of the vehicle to electrical energy for storage at traction battery 14 as indicated by arrow 30.

In other embodiments, PHEV 10 is configured as a series type vehicle propulsion system, whereby engine 12 does not directly propel the vehicle. Rather, engine 12 is operated to power motor 16, which in turn propels the vehicle via wheel 24. For example, during select operating conditions, engine 12 drives generator 18, which in turn supplies electrical energy to motor 16 as indicated by arrow 36 and/or to traction battery 14 as indicated by arrow 30. As another example, engine 12 drives motor 16 and the motor provides a generator function to convert the engine output to electrical energy, where the electrical energy is stored at traction battery 14 for later use by the motor.

Traction battery 14 is rechargeable from a power source 38 residing external the vehicle (e.g., an external electric grid). Traction battery 14 periodically receives electrical energy from grid 38 as indicated by arrow 40. During a recharging operation, the electrical energy may be supplied to traction battery 14 from grid 38 via an electrical cable 42. In this way, motor 16 may propel the vehicle by utilizing an energy source (e.g., electrical energy) other than the fuel used by engine 12.

Control system 22 can monitor the amount of electrical energy stored at traction battery 14 (e.g., the state-of-charge (SOC) of the traction battery). In this way, control system 22 can control the operation of engine 12 and traction battery 14 for propelling the vehicle as a function of the amount of electrical energy stored at traction battery 14 and other variables.

PHEV 10 further includes an auxiliary battery 48, one or more accessory loads 50, and a controller 52. Auxiliary battery 48 and accessory loads 50 are electrically connected to one another via a voltage bus 54. Auxiliary battery 48 provides electrical energy to accessory loads 50 for their operation via voltage bus 54. Accessory loads 50 include low-voltage (LV) vehicle accessories such as cooling pump, fans, heater, power steering, braking, etc.

Controller 52 can monitor the amount of electrical energy stored at auxiliary battery 48 (e.g., the SOC of the auxiliary battery). Briefly, it is noted that control system 22 and controller 52 may be combined into a single controller.

Traction battery 14 and auxiliary battery 48 are electrically connectable to one another via an interface 56. Interface 56 is in the form of a converter such as a DC/DC (direct current/direct current) converter. On the one hand, converter 56 is electrically connectable to an electrical connection 58 which is electrically connected to traction battery 14, and on the other hand, converter 56 is electrically connectable to voltage bus 54 which is electrically connected to auxiliary battery 48 as well as to accessory loads 50. Accordingly, when electrically connected to both voltage bus 54 and electrical connection 58, converter 56 electrically connects traction battery 14 and auxiliary battery 48.

Converter 56 may be a buck boost converter that functions in a bi-directional manner to either step a low voltage of, for example, 12 volts (e.g., a typical voltage of auxiliary battery 48) up to a high voltage of, for example, 400 volts (e.g., a typical voltage of traction battery 14) or to step down the high voltage to the low voltage when traction battery 14 and auxiliary battery 48 are electrically connected via converter 56. In this example, voltage bus 54 is a 12-volt voltage bus.

Controller 52 is operable with converter 56 to selectively electrically connect traction battery 14 with auxiliary battery 48 and to selectively electrically disconnect traction battery 14 from auxiliary battery 48.

Of course, traction battery 14 and auxiliary battery 48 may be electrically connected to one another via converter 56 at all times. In this case, in a first instance, controller 52 may set the DC-DC output voltage set-point of converter 56 to a value that allows discharge of electrical energy of traction battery 14 to auxiliary battery 48. Conversely, in a second instance, controller 52 may set the DC-DC output voltage set-point of converter 56 to a value that allows discharge of electrical energy of auxiliary battery 48 to accessory loads 50 without electrical energy of traction battery being discharged to either auxiliary battery 48 or accessory loads 50. Herein, the first instance falls under the "electrically connect" category whereas the second instance falls under the "electrically disconnect" category.

As described, PHEV 10 includes high and low voltage electrical systems. The high voltage (HV) electrical system, which includes traction battery 14, provides the electric energy for vehicle propulsion. The low voltage (LV) electrical system, which includes auxiliary battery 48, provides the electric energy for vehicle accessories. The high and low voltage electrical systems interface via converter 56. As an example, traction battery 14 includes one or more electric batteries and/or capacitors suitable for meeting electric energy needs for vehicle propulsion whereas auxiliary battery 48 is a "12V" type of battery suitable for meeting electric energy needs for vehicle accessories.

As will be described in greater detail below, an embodiment of the present invention provides a method of control for active depletion of auxiliary battery 48 of PHEV 10. Although PHEV 10 of FIG. 1 has been described as being a plug-in HEV, the method is also applicable to a HEV which lacks the ability to recharge its traction battery via an external electric grid. In this case, the configuration of PHEV 10 shown in FIG. 1 would essentially be modified to omit grid 38, electrical energy flow 40, and electrical cable 42. However, the method is still applicable to a HEV as will be described below. The method is also applicable to battery electric vehicles (BEV) not having any internal combustion engines as will be described below.

Figure 2:
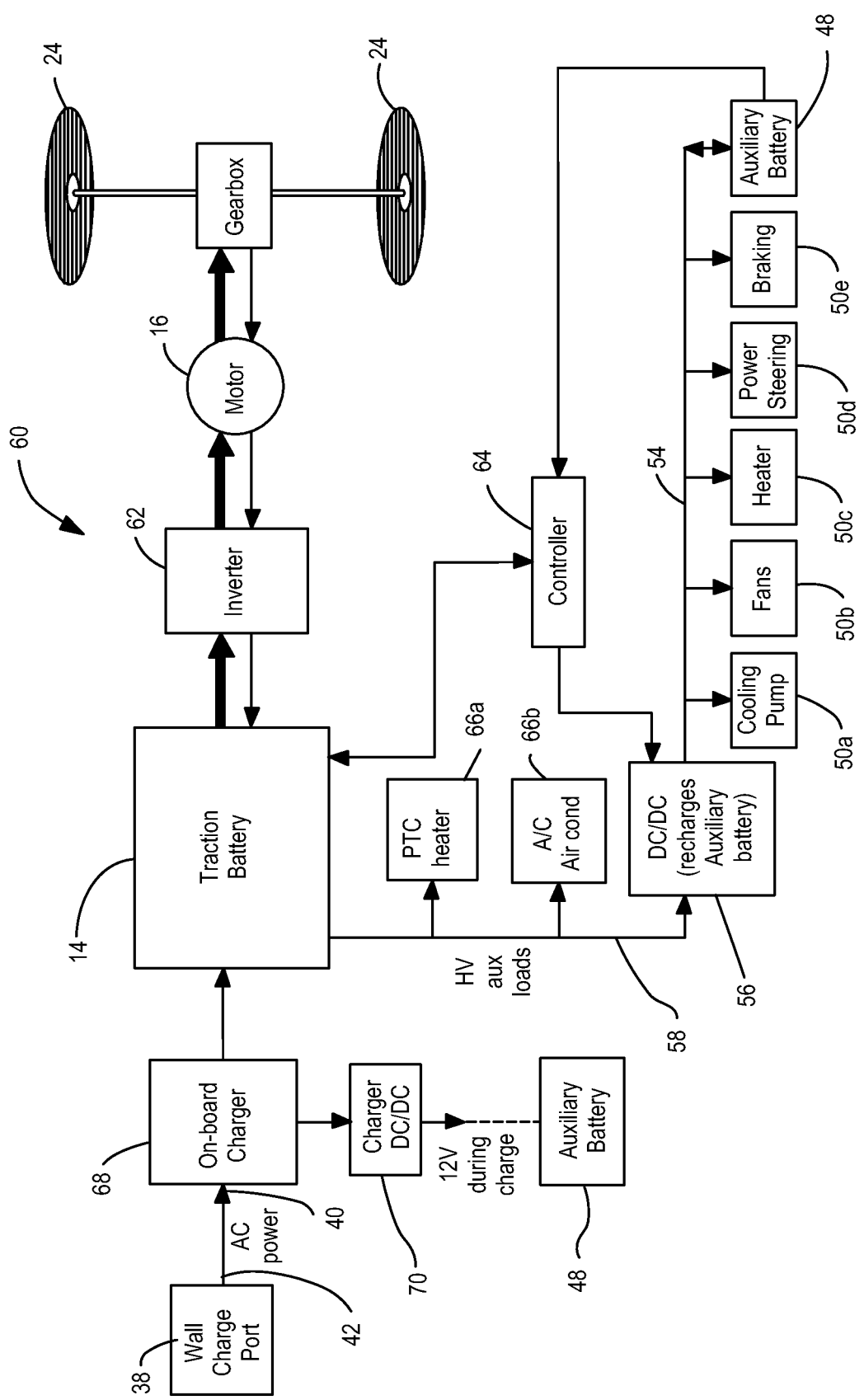
FIG. 2 illustrates a block diagram of a battery electric vehicle (BEV) in accordance with an embodiment of the present invention.

Referring now to FIG. 2, with continual reference to FIG. 1, a BEV 60 in accordance with an embodiment of the present invention is shown. BEV 60 shares many of the same types of components as PHEV 10 and like components including traction battery 14 rechargeable via grid 38 are labeled with the same reference numerals. As noted, BEV 60 differs from PHEV 10 and from a HEV in that BEV 60 lacks engine 12 and its associated fuel system 20. As a result, traction battery 14 is in effect the sole source of energy for vehicle propulsion while the vehicle is in operation (e.g., while traction battery 14 is disconnected from grid 38).

Traction battery 14 delivers electrical energy to motor 16 via an inverter 62, whereby the motor consumes the electrical energy to produce a motor output to propel the vehicle. The electrical energy delivered from traction battery 14 is DC electrical energy. Inverter 62 converts this DC electrical energy into AC electrical energy for receipt by motor 16 during vehicle propulsion operations. Conversely, inverter 62 converts AC electrical energy from motor 16 into DC electrical energy for receipt by traction battery 14 during regenerative braking operations. Although not shown in FIG. 1, PHEV 10 likewise includes such an inverter between traction battery 14 and motor 16 and traction battery 14 and motor 16 of PHEV 10 employ the same DC to AC and AC to DC conversions.

BEV 60 further includes a controller 64. Controller 64 performs the applicable operations that are performed by control system 22 and controller 52 of PHEV 10. To this end, controller 64 can monitor the amount of electrical energy stored at traction battery 14 and at auxiliary battery 48.

Again, traction battery 14 and auxiliary battery 48 are electrically connectable to one another via converter 56. In particular, converter 56 is electrically connectable to electrical connection 58 which is electrically connected to traction battery 14 and converter 56 is electrically connectable to voltage bus 54 which is electrically connected to auxiliary battery 48 as well as to accessory loads 50. Controller 64 is operable with converter 56 to selectively electrically connect traction battery 14 with auxiliary battery 48 and to selectively electrically disconnect traction battery 14 from auxiliary battery 48.

In this embodiment, traction battery 14 is configured to supply electrical energy to other electrical loads residing on-board the vehicle (other than motor 16) including high-voltage (HV) auxiliary loads such as PTC heater 66a and air conditioning unit 66b. Such HV auxiliary loads 66 are electrically connected to electrical connection 58 which is electrically connected to traction battery 14. Again, auxiliary battery 48 is configured to supply electrical energy to the low-voltage (LV) accessory loads 50 which are electrically connected to auxiliary battery 48 via vehicle bus 54.

Again, traction battery 14 is rechargeable from grid 38. In particular, traction battery 14 periodically receives AC electrical energy from grid 38 via electrical cable 42 connected to grid 38 as indicated by arrow 40. BEV 60 includes an on-board charger 68 which receives the AC electrical energy from grid 38. Charger 68 is an AC/DC converter which converts the received AC electrical energy into HV DC electrical energy suitable for charging traction battery 14. In turn, charger 68 supplies the HV DC electrical energy to traction battery 14 in order to charge traction battery 14 during the recharging operation.

Charger 68 has an associated auxiliary battery charger 70. During the recharging operation, charger 68 supplies some of the DC electrical energy to charger 70. Charger 70 is a DC/DC converter. Charger 70 converts the DC electrical energy from charger 68 into DC electrical energy suitable for charging auxiliary battery 48 (i.e., charger 70 is a step down converter which converts the HV DC electrical energy from charger 68 into LV ("12V") DC electrical energy for auxiliary battery 48). In turn, charger 70 supplies the LV DC electrical energy to auxiliary battery 48 in order to charge auxiliary battery 48 during the recharging operation, as indicted by the dotted line in FIG. 2.

As indicated above, an embodiment of the present invention provides a method of control for active depletion of an auxiliary battery of an electric vehicle (such as PHEV 10 and BEV 60 and as well as a HEV). The general operation of the method will be described with respect to FIG. 3 after the following observations regarding traction battery 14 and auxiliary battery 48 are made.

Traction battery 14 is part of the high-voltage (HV) electrical system of the vehicle. Traction battery generally provides HV electrical energy to motor 16 for vehicle propulsion. The HV electrical energy may be on the order of, for example, 400 volts. Traction battery 14 may be, for example, a high voltage super-capacitor or an electro-chemical storage device such as a lithium ion (LION) battery. Traction battery 14 may include one or more electric batteries and/or capacitors which are connected in series to operate at relatively higher voltages.

Auxiliary battery 48 is part of the low-voltage (LV) electrical system of the vehicle. Auxiliary battery 48 provides LV electrical energy to accessory loads 50 for their operations. The LV electrical energy is on the order of 12 volts as this is generally the standard voltage for auxiliary battery operations. Of course, if the standard voltage were different, such as 15 volts, then the LV electrical energy would be on the order of 15 volts. As such, auxiliary battery 48 is a "12V" type of battery. Auxiliary battery 48 may be a conventional battery such as a lead acid battery. Preferably, auxiliary battery 48 has the ability to allow deep discharge and cycling (recharge-discharge). Further, auxiliary battery 48 is preferably able to tolerate voltages above open circuit voltage of conventional 12V batteries (for example, 12.5V).

Figures 3, 4:
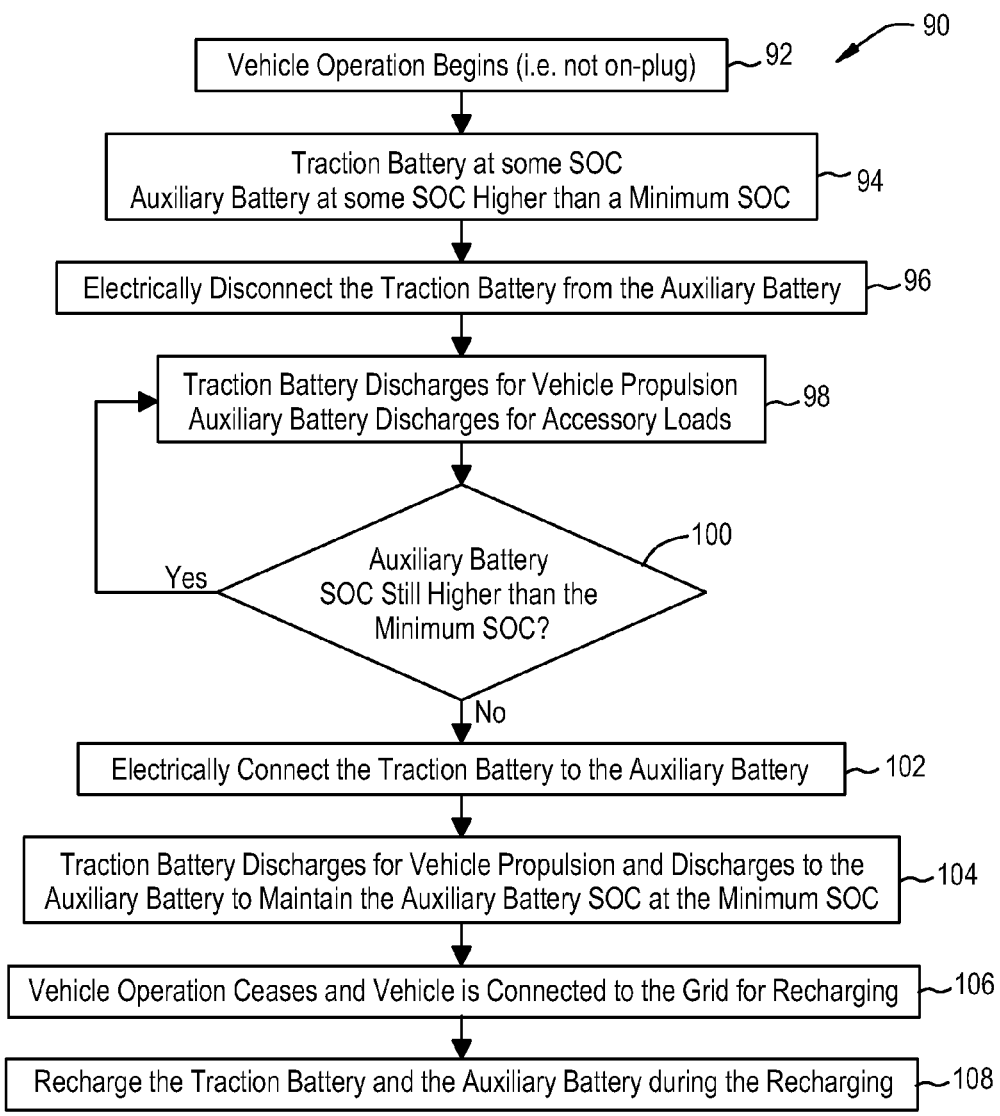
FIG. 3 illustrates a flowchart describing general operation of a method of control for active depletion of the auxiliary battery of an electric vehicle in accordance with an embodiment of the present invention.
FIG. 4 illustrates a flowchart describing in further detail the operation of the method of control for active depletion of the auxiliary battery of an electric vehicle.

Referring now to FIG. 3, with continual reference to FIGS. 1 and 2, a flowchart 80 describing general operation of a method of control for active depletion of the auxiliary battery (such as auxiliary battery 48) of an electric vehicle (such as PHEV 10 or BEV 60) in accordance with an embodiment of the present invention is shown. The method generally includes three phases: discharge phase 82, maintain phase 84, and recharge phase 86, which run sequentially during a given cycle as shown in FIG. 3.

Discharge phase 82 occurs while the electric vehicle is being driven (i.e., while the vehicle is not plugged into grid 38). Discharge phase 82 begins with a controller (e.g., controller 64) controlling converter 56 to electrically disconnect traction battery 14 from auxiliary battery 48. Accordingly, during discharge phase 82, electrical energy from traction battery 14 is used for vehicle propulsion and possibly for HV auxiliary loads 66 while electrical energy from auxiliary battery is used for accessory loads 50. More particularly, traction battery 14 is prevented from supplying electrical energy to auxiliary battery 48 during discharge phase 82.

Further, as generally described above, traction battery 14 and auxiliary battery 48 may be both electrically connected to converter 56 during discharge phase 82. Controller 64 sets the DC-DC output voltage set-point of converter 56 to a value that allows for continuous discharge of auxiliary battery 48 while still maintaining the "loads" on vehicle bus 54 to a reasonable level.

At the beginning of discharge phase 82, auxiliary battery 48 has a SOC greater than a minimum auxiliary battery (AB) SOC. (It is assumed that auxiliary battery 48 has been charged to have a SOC greater than the minimum AB SOC prior to the commencement of discharge phase 82.) The minimum AB SOC is the minimum SOC that auxiliary battery 48 can have in order to adequately provide electrical energy to accessory loads 50. For example, assume auxiliary battery 48 is a "12V" type of battery having an open circuit voltage of 12.7 volts when its SOC is 100%. As such, auxiliary battery 48 is able to provide adequate electrical energy to the "12V" accessory loads 50. However, the open circuit voltage of auxiliary battery 48 decreases as its SOC decreases while auxiliary battery 48 discharges. For instance, at a SOC of 30%, the open circuit voltage of auxiliary battery 48 may only be around 11.75 volts which may be just sufficient for accessory loads 50. Any further decrease of the SOC of auxiliary battery 48 would result in a lower open circuit voltage which compromises the operations of accessory loads 50 when powered by auxiliary battery 48. Accordingly, as long as the SOC of auxiliary battery 48 is greater than 30% (i.e., the minimum AB SOC) auxiliary battery 48 may provide sufficient electrical energy to accessory loads 50. Once the SOC of auxiliary battery 48 reaches, or is lower than, the minimum AB SOC (30% in this example) auxiliary battery 48 cannot provide sufficient electrical energy to accessory loads 50.

As indicated, the SOC of auxiliary battery 48 decreases as auxiliary battery 48 discharges to provide electrical energy to accessory loads 50 during discharge phase 82. Controller 64 monitors the SOC of auxiliary battery 48. Once the SOC of auxiliary battery 48 reaches the minimum AB SOC, controller 64 controls the operation converter 56 in order for the method to proceed from discharge phase 82 to maintain phase 84.

Maintain phase 84 also occurs while the electric vehicle is being driven (i.e., while the vehicle is not plugged into grid 38). Maintain phase 84 begins with controller 64 controlling converter 56 to electrically connect traction battery 14 to auxiliary battery 48. (Again, controller 64 sets the DC-DC output voltage set-point of converter 56 to an appropriate different value.) Accordingly, during maintain phase 84, electrical energy from traction battery 14 is used for vehicle propulsion, possibly for HV auxiliary loads 66, and for charging auxiliary battery 48. Traction battery 14 can supply electrical energy to auxiliary battery 48 (via converter 56) as traction battery 14 is electrically connected to auxiliary battery 48 during maintain phase 84. Likewise, traction battery 14 can supply electrical energy to accessory loads 50 during maintain phase 84.

At the beginning of maintain phase 84, auxiliary battery 48 has a SOC generally equal to the minimum AB SOC. Controller 64 controls traction battery 14 and/or converter 56 such that traction battery supplies to auxiliary battery 48 just enough electrical energy to "maintain" the SOC of auxiliary battery at the minimum AB SOC.

It is noted that one reason for maintaining the SOC of auxiliary battery 48 at the minimum AB SOC instead of just letting the auxiliary battery discharge is that the ability of auxiliary battery 48 to recharge may be compromised if the SOC of auxiliary battery 48 gets too low. Preferably, the SOC of auxiliary battery 48 is not increased with electrical energy from traction battery 14 during maintain phase 84 as the electrical energy of traction battery 14 should be maintained for future vehicle propulsion and as the additional recharging of auxiliary battery 48 with electrical energy from traction battery 14 may not be efficient. In sum, during maintain phase 84, the SOC of auxiliary battery 48 is maintained at the minimum AB SOC until the method proceeds to recharge phase 86 where the electric vehicle is parked and plugged into grid 38.

As indicated, recharge phase 86 begins with the electric vehicle being plugged into grid 38. During recharge phase 86, the vehicle receives electrical energy from grid 38 which is used to recharge both traction battery 14 and auxiliary battery 48. This recharging has been described above with reference to FIGS. 1 and 2. After recharging phase 86 is complete, traction battery 14 and auxiliary battery 48 both are fully charged (e.g., 100% SOC). The method then begins another cycle starting at discharge phase 82 upon the vehicle being unplugged and in operation.

Referring now to FIG. 4, with continual reference to FIGS. 1, 2, and 3, a flowchart 90 describing in further detail the operation of the method of control for active depletion of the auxiliary battery of an electric vehicle is shown.

Initially, the operation of the vehicle begins as shown in block 92. As such, the vehicle is not plugged into grid 38 and is able to propel along a distance. Upon the beginning of the vehicle operation, traction battery 14 has a given SOC and auxiliary battery 48 has a given SOC higher than the minimum AB SOC as shown in block 94. A controller (e.g., controller 64) controls converter 56 to electrically disconnect traction battery 14 from auxiliary battery 48 as shown in block 96. Accordingly, traction battery 14 discharges for vehicle propulsion whereas auxiliary battery 48 discharges for accessory loads 50 as shown in block 98. Controller 64 monitors the SOC of auxiliary battery 48 and compares the SOC of auxiliary battery 48 to the minimum AB SOC as shown in block 100. Blocks 92, 94, 96, 98, and 100 represent activities during discharge phase 82.

Once the SOC of auxiliary battery 48 reaches the minimum AB SOC, controller 64 controls converter 56 to electrically connect traction battery 14 to auxiliary battery 48 as shown in block 102. In turn, in addition to discharging for vehicle propulsion, traction battery 14 discharges to auxiliary battery 48 to maintain the SOC of auxiliary battery 48 at the minimum AB SOC as shown in block 104. Blocks 102 and 104 represent activities during maintain phase 84.

Subsequently, the operation of the vehicle ceases and the vehicle is connected to grid 38 for recharging as shown in block 106. In turn, traction battery 14 and auxiliary battery 48 are recharged during the recharging as shown in block 108. Blocks 106 and 108 represent activities during recharge phase 86.

Although the operation of the method as illustrated in FIGS. 3 and 4 has been described in conjunction with a PHEV and a BEV, the method is also applicable to a HEV. In this case, recharge phase 86 is modified to take into account that no recharging via grid 38 is done. In particular, recharge phase 86 is modified such that the recharging of auxiliary battery 48 occurs while kinematic energy of the vehicle is recovered in electric form at suitable times (for instance, after traction battery 14 has been adequately recharged). For example, the recharging of auxiliary battery 48 occurs during regenerative braking charging. Likewise, recharge phase 86 for a PHEV may be modified in a similar manner.

It is noted that the method may provide the most benefit to a BEV in that the electrical energy depleted from auxiliary battery 48 adds distance range to the electric vehicle (for example, 2-3 miles @ 200 Wh/mile) as traction battery 14 does not replenish this "lost energy" to auxiliary battery 48.

As described, an embodiment of the present invention provides a method of control for active depletion of an auxiliary battery of an electric vehicle. Under control of the method, an electric vehicle incorporates active auxiliary battery depletion strategy that utilizes more of the electrical energy of the auxiliary battery. The strategy results in a lower SOC of the auxiliary battery during operation of the vehicle. The auxiliary battery energy is replenished when the vehicle is connected for charging from an external power source. This technique provides an extra energy capacity available for use during vehicle operation. Also, this technique prevents constant maintenance and 12V auxiliary charging burden during lower efficiency operation. This technique controls auxiliary battery depletion within limits until more efficient higher loads can be used.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed:

1. A method comprising:
discharging an auxiliary battery of an electric vehicle while the auxiliary battery has more than a minimum energy;
preventing a traction battery of the vehicle from charging the auxiliary battery while the auxiliary battery has more than the minimum energy; and
upon the auxiliary battery having the minimum energy, charging the auxiliary battery with the traction battery to maintain the auxiliary battery at the minimum energy.

2. The method of claim 1 further comprising:
recharging the auxiliary battery and the traction battery via an electric grid.

3. The method of claim 1 wherein:
the discharging, preventing, and charging steps occur while the vehicle is being driven.

4. The method of claim 1 wherein:
preventing the traction battery from charging the auxiliary battery includes electrically disconnecting the traction battery from the auxiliary battery; and
charging the auxiliary battery with the traction battery includes electrically connecting the traction battery to the auxiliary battery.

5. The method of claim 1 further comprising:
discharging the traction battery to propel the vehicle;
wherein discharging the auxiliary battery includes discharging the auxiliary battery to operate a vehicle accessory.

6. The method of claim 1 wherein the auxiliary battery and the traction battery are electrically connected to a converter, wherein:
preventing the traction battery from charging the auxiliary battery includes setting a set-point of the converter to a first value that allows for preventing the traction battery from charging the auxiliary battery;
charging the auxiliary battery with the traction battery includes setting the set-point of the converter to a second value that allows for charging the auxiliary battery with the traction battery to maintain the auxiliary battery at the minimum energy.

7. The method of claim 1 wherein:
the minimum energy of the auxiliary battery is a minimum state of charge (SOC) of the auxiliary battery.

8. The method of claim 1 wherein:
the ability of the auxiliary battery to provide energy to a vehicle accessory is compromised when the auxiliary battery has less than the minimum energy.

9. The method of claim 1 wherein:
charging the auxiliary battery with the traction battery includes charging the auxiliary battery with the traction battery to increase energy of the auxiliary battery more than minimum energy.

10. The method of claim 2 further comprising:
connecting the vehicle to the electrical grid for the auxiliary battery and the traction battery to be recharged with energy from the electrical grid.

11. An electric vehicle comprising:
an electric machine;
a traction battery electrically connected with the electric machine;
an auxiliary battery; and
a controller configured to prevent the traction battery from charging the auxiliary battery while the auxiliary battery has more than a minimum energy;
wherein the controller is further configured to, upon the auxiliary battery having the minimum energy, enable the traction battery to charge the auxiliary battery such that the auxiliary battery is maintained at the minimum energy;
wherein the controller is further configured to prevent the traction battery from charging the auxiliary battery and is further configured to enable the traction battery to charge the auxiliary battery while the electric vehicle is being driven.

12. The electric vehicle of claim 11 wherein:
the traction battery and the auxiliary battery are configured to be recharged via an electric grid while the electric vehicle is connected to the electric grid.

13. An electric vehicle comprising:
an electric machine;
a traction battery electrically connected with the electric machine;
an auxiliary battery; and
a controller configured to prevent the traction battery from charging the auxiliary battery while the auxiliary battery has more than a minimum energy;
wherein the controller is further configured to, upon the auxiliary battery having the minimum energy, enable the traction battery to charge the auxiliary battery such that the auxiliary battery is maintained at the minimum energy;
wherein the controller is further configured to electrically disconnect the traction battery from the auxiliary battery in order to prevent the traction battery from charging the auxiliary battery;
wherein the controller is further configured to electrically connect the traction battery to the auxiliary battery in order to enable the traction battery to charge the auxiliary battery.

14. The electric vehicle of claim 11 wherein:
the traction battery is configured to supply energy for propulsion of the electric vehicle; and
the auxiliary battery is configured to supply energy for operation of a vehicle accessory.

15. The electric vehicle of claim 11 further comprising:
a converter;
wherein the traction battery is electrically connected to the converter and the auxiliary battery is electrically connected to the converter;
wherein the controller is further configured to set a set-point of the converter to a first value that prevents the traction battery from charging the auxiliary battery;
wherein the controller is further configured to set the set-point of the converter to a second value that enables the traction battery to charge the auxiliary battery such that the auxiliary battery is maintained at the minimum energy.

16. The electric vehicle of claim 15 wherein:
the minimum energy of the auxiliary battery is a minimum state of charge (SOC) of the auxiliary battery.

17. The electric vehicle of claim 11 wherein:
the ability of the auxiliary battery to provide energy to a vehicle accessory is compromised when the auxiliary battery has less than the minimum energy.

18. The electric vehicle of claim 11 wherein:
the controller is further configured to enable the traction battery to charge the auxiliary battery to increase energy of the auxiliary battery more than minimum energy.

19. The electric vehicle of claim 11 wherein:
the controller is further configured to enable the auxiliary battery to discharge while the auxiliary battery has more than a minimum energy.

* * * * *